(12) United States Patent
Khosla et al.

(10) Patent No.: US 7,757,595 B2
(45) Date of Patent: Jul. 20, 2010

(54) METHODS AND APPARATUS FOR OPTIMAL RESOURCE ALLOCATION

(75) Inventors: Deepak Khosla, Camarillo, CA (US); Thomas S. Nichols, La Habra, CA (US)

(73) Assignee: Raytheon Company, Waltham, MA (US)

( * ) Notice: Subject to any disclaimer, the term of this patent is extended or adjusted under 35 U.S.C. 154(b) by 1017 days.

(21) Appl. No.: 11/279,824

(22) Filed: Apr. 14, 2006

(65) Prior Publication Data

US 2007/0244673 A1    Oct. 18, 2007

(51) Int. Cl.
    *F41G 9/00* (2006.01)
(52) U.S. Cl. ........................................ 89/1.11
(58) Field of Classification Search ................ 89/1.11
    See application file for complete search history.

(56) References Cited

U.S. PATENT DOCUMENTS

| | | | |
|---|---|---|---|
| 5,153,366 A * | 10/1992 | Lucas | 89/1.11 |
| 5,404,516 A | 4/1995 | Georgiades et al. | |
| 5,511,218 A * | 4/1996 | Castelaz | 718/102 |
| 5,992,288 A * | 11/1999 | Barnes | 89/1.11 |
| 6,497,169 B1 * | 12/2002 | Khosla | 89/1.11 |
| 6,839,662 B2 * | 1/2005 | Schnatterly et al. | 89/1.11 |
| 7,078,899 B2 * | 7/2006 | Dale et al. | 324/314 |

* cited by examiner

*Primary Examiner*—Stephen M Johnson
(74) *Attorney, Agent, or Firm*—Daly, Crowley, Mofford & Durkee, LLP

(57) ABSTRACT

Method and apparatus to automatically allocate and schedule weapon systems to threats for maximizing an engagement objective. In one aspect, methods and systems maximize threat killed. In another aspect, methods and systems maximize asset survival against threats. The methods and apparatus considers temporal and resource constraints such that weapons systems are able to engage threats assigned to them.

3 Claims, 6 Drawing Sheets

METHODS AND APPARATUS FOR OPTIMAL RESOURCE ALLOCATION

CROSS REFERENCE TO RELATED APPLICATIONS

Not Applicable.

STATEMENT REGARDING FEDERALLY SPONSORED RESEARCH

Not Applicable.

BACKGROUND

As is known in the art, systems can evaluate threats to be targeted by one or more weapon systems. Known target-weapon pairing systems do not model weapon resource and temporal constraints when suggesting or making allocation decisions. Thus, when multiple threats with overlapping engagement time windows are assigned to a weapon system, there is a possibility that the weapon system may not have sufficient time-critical resources to engage these threats. Even if the weapon system informs the engagement operator about its failure to engage one or more threats and the operator then selects the next ranked weapon system for these threats, this may result in unnecessary delay in engaging threats. In addition, in a battle-space with a large number of threats, there is still a small possibility that the second and even lower ranked weapon system chosen by the operator may run into similar resource limitations. In such a case, some threats may not be addressed.

In a typical battlefield situation at any time, there may be multiple threats headed towards valuable defended assets and multiple weapon systems available to counteract these threats. In battle management, a centralized decision-making process allocates specific threats to specific weapon systems. Such schemes usually begin by predicting the destructive effect of the incoming threat against defended assets. They also consider the effectiveness of the available weapon systems in neutralizing any given threat which include factors such as threat type and time-to-intercept. A typical battle management scheme lists all weapon systems capable of engaging a threat and ranks them based on their effectiveness in neutralizing it. The engagement operator then decides which weapon system to select for a threat based not only on the rank, but additional factors such as weapon inventory and engagement objective. In a battle-space situation with a large number of threats and weapon systems, the engagement operator has to analyze a large number of possible combinations and factors to make the pairing decision. This is further complicated by rapidly changing battle-space situations and could result in delay and poor judgments and decisions. The net result is ineffective battle management that could directly impact the survivability of the defended assets. Thus there is a need for methods that could analyze the vast amount of data and factors to decide the most effective pairing.

U.S. Pat. No. 6,497,169 B1, entitled "Method for Automatic Weapon Allocation and Scheduling Against Attacking Threats," which is incorporated herein by reference, discloses one such system. While the '169 patent provides weapon-target pairing and launch times for small problem sizes, the disclosed system is relatively slow and may give sub-optimal solutions for larger problem sizes. In addition this approach cannot be applied to the asset survival maximization problem because of the assumption of independence of weapon systems that is true for the threat kill maximization objective. Other previous attempts that utilize static-weapon target allocation are also limited in their solutions.

U.S. Pat. No. 5,404,516 considers scheduling of resources such as weapons, but uses a scheduling method that is relatively slow. U.S. Pat. No. 5,992,288 entitled "Knowledge based automatic threat evaluation and weapon assignment" evaluates threats and, based on trial-intercept calculations, determines which weapon systems can engage it and ranks them based on their effectiveness in neutralizing a threat. The algorithm selects the best weapon to neutralize the threat. No optimization across the battlespace is done.

U.S. Pat. No. 5,511,218, "Connectionist architecture for weapons assignment", U.S. Pat. No. 5,153,366, "Method for allocating and assigning defensive weapons against attacking weapons," and the '516 patent; all of which are incorporated herein by reference, are applicable to the static target-weapon pairing problem. However, as discussed above, none of them optimize the deployment or launch time of the weapon system.

BRIEF DESCRIPTION OF THE DRAWINGS

The foregoing features of this invention, as well as the invention itself, may be more fully understood from the following description of the drawings in which.

DETAILED DESCRIPTION

In general, the invention provides methods and apparatus for automatically allocating and scheduling defensive weapons against attacking threats to maximize desired engagement objectives. In one embodiment, a system addresses not only the weapon-target pairing problem, but also the optimal launch times of the weapon systems to meet the desired objectives. In one aspect of the invention, an algorithm and system maximizes the number of enemy threats killed. In another aspect of the invention, a set of algorithms with different speeds and optimality maximizes asset survival against attacking threats. In a further aspect, an exemplary embodiment considers temporal and resource constraints such that the weapon systems can engage threats assigned to them. With this arrangement, effective battle management is provided under heavy attack situations that may seem to outnumber weapon resources. In one particular embodiment, an algorithm is a hybrid genetic type algorithm that uses a true genetic algorithm and merges it with a simulated-annealing type and other heuristic algorithms.

The inventive embodiments provide methods and systems for automatically allocating and scheduling weapon system to threats such that battle-space engagement objectives are optimized. One embodiment computes an optimized allocation and scheduling that can be made available to the engagement operator as a so-called just-in-time (JIT) solution. Advantages of exemplary embodiments include that by modeling engagement resource and temporal constraints of each weapon system during the optimal allocation computation process itself, each weapon system is only allocated threats that it can actually engage with maximal utilization of its resources.

While the invention in primarily shown and described in conjunction with defense and military applications that require allocation and scheduling of resources to satisfy one or more time critical objectives, it is understood that the invention is applicable to environments in which it is desirable to allocate time-critical resources to optimize one or more objectives, such as protecting assets. Other exemplary applications include military planning and dynamic sensor management. In one embodiment, inventive embodiments can be readily integrated into existing systems, such as by adding software modules.

Figure 1:
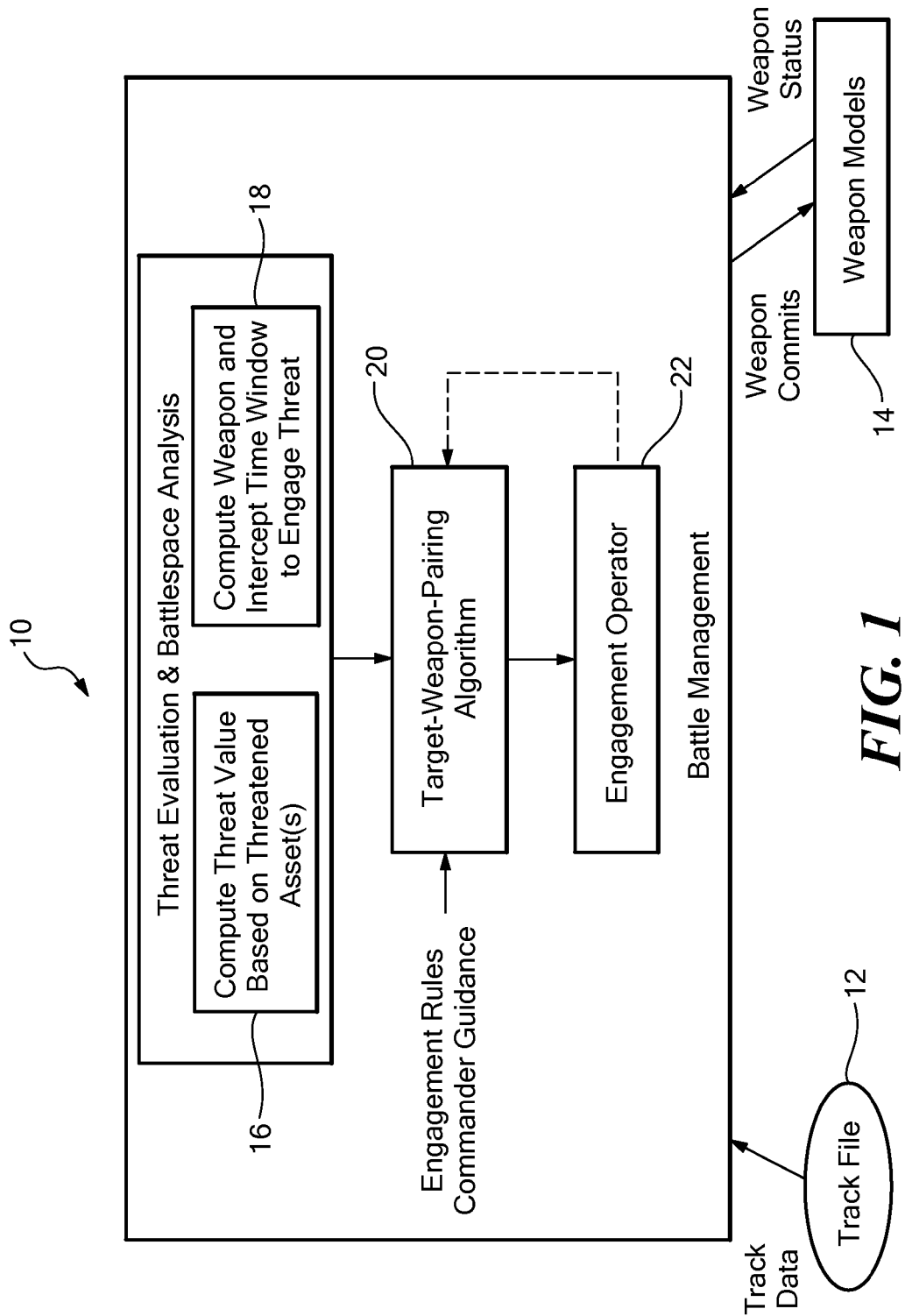
FIG. 1 is a block diagram of an exemplary system to automatically allocate and schedule resources to threats in accordance with embodiments of the invention.

FIG. 1 shows an exemplary battle management system 10 having target-weapon pairing in accordance with exemplary embodiments of the invention. The system 10 receives target track data from a track file 12. A weapon model module 14 models supported weapon systems for optimizing weapon system assignments. The weapon model module 14 generates weapon commitments and provides weapon status information. A threat evaluation module 16 and a battle space analysis module 18 receive the target track data and weapon information and provide information to a target-weapon pairing mechanism 20, which uses the target track data and weapon model information to generate weapon system commitments, as described in detail below. Optionally, a weapon engagement operator 22 can control weapon assignments and provide other functions.

Before describing exemplary embodiments of the invention in detail, some introductory material is provided. Force optimization refers to the problem of threat engagement and dynamic weapon-target allocation (WTA) across the force. The goal is to allocate and schedule defensive weapon resources over a given period of time so as to achieve certain battle management objectives subject to resource and temporal constraints. Dynamic WTA involves optimization across both resources (weapons) and time. This problem is referred to as the weapon allocation and scheduling problem (WAS). As discussed in detail below, inventive embodiments address the WAS problem for two separate battle management objectives: (1) Threat Kill Maximization (TKM), and (2) Asset Survival Maximization (ASM). These objectives can be referred to as WAS-TKM and WAS-ASM, respectively.

Both WAS problems are NP-complete problems and belong to a class of multiple-resource-constrained optimal scheduling problems. While the above objectives appear to be intuitively similar from a battle management perspective, the two optimal scheduling problems are different in their complexity.

In one embodiment, a hybrid genetic algorithm (GA) combining a traditional genetic algorithm and a simulated annealing-type algorithm is used for solving these problems. The hybrid GA approach uses a simulated annealing-type heuristic to compute the fitness of a GA-selected population. This also optimizes the temporal dimension (scheduling) under resource and temporal constraints and is significantly different for the WAS-TKM and WAS-ASM problems. The inventive embodiments provide schedules that are near optimal in short cycle times and have minimal perturbation from one cycle to the next.

In general, the inventive methods and apparatus enable automatically allocating and scheduling defensive weapons against attacking threats to maximize an engagement objective.

Figure 2:
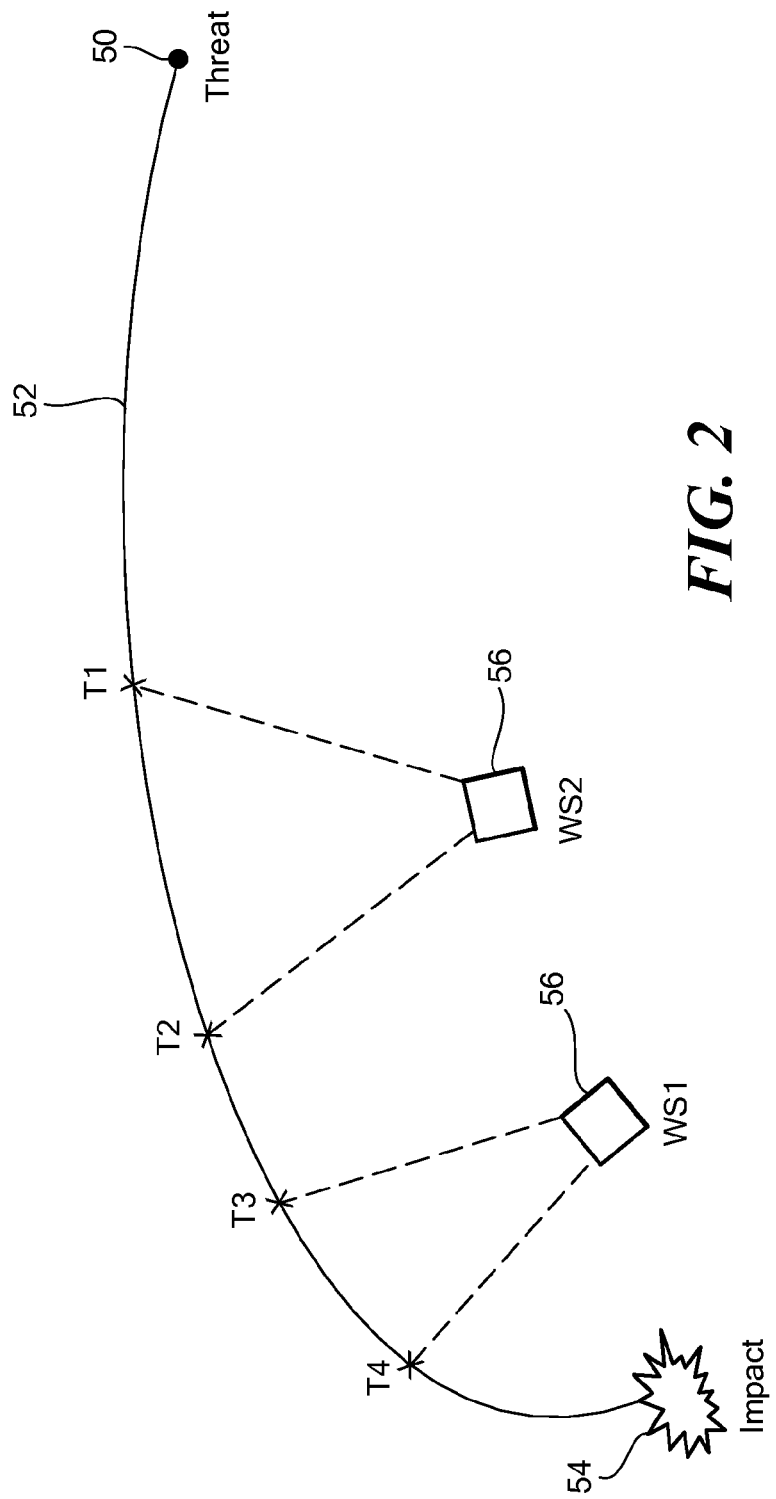
FIG. 2 is a pictorial representation showing a threat that can be addressed by the system of FIG. 1.

FIG. 2 shows an exemplary battle space analysis for a threat 50, shown as a missile. After detection and tracking, a trajectory 52 and impact point 54 is determined. For each point along the trajectory, various weapon systems 56 are evaluated to determine if the threat can be intercepted. If constraints are satisfied, feasible intercept points are identified. For example, a first weapon system 56 can have a feasible intercept interval between first and second times T1, T2 and a second weapon system can have a feasible intercept time between third and fourth times T3, T4. Where multiple weapon system can engage a threat, options can be ranked.

Conventional methods and systems to automatically assign weapons to threats basically assist in or replace the time-consuming task of manual decision-making. These methods select the target-weapon pairing that optimizes the engagement objective, such as maximizing the threat neutralized. Other known techniques also consider other objectives (such as weapon load balancing, engaging certain high-payoff threats, etc.) and constraints (such as weapon inventory). However, none of these methods consider additional time-dependent resources of the weapon system. In other words, they only address the static WTA problem that is to determine the optimal allocation of weapon systems to engage threats. While some of these approaches have used trial-intercept calculations to determine the window of engagement to determine a weapon system's effectiveness against a threat, they do not address the issue of when to deploy the weapon system against the threat in this window of opportunity. The deployment aspect of the problem becomes crucial when the resource requirements are limited and time-dependent (such as limited maximum guidance capacity, i.e., maximum number of interceptors that can be simultaneously guided).

Conventional systems using static allocation methods leave the decision of when to engage threats up to the weapon system. Thus, they are based on a sequential two-step decision process. In the first step, the algorithm decides on which threat(s) to assign to a weapon system based on their effectiveness measures. In the second step, each weapon system makes its decision about when to deploy and engage threat(s) assigned to it from the first step. Since the first step did not model the engagement-time resource requirements and temporal constraints of the weapon systems, there is a possibility that a weapon system may have been assigned enough threats to overwhelm its time-dependent resources. Only when these threats are assigned to the weapon system and it performs its own calculations in the second step on when to engage them is it determined whether or not the weapon is able to engage all these threats. In such a case, either the weapon system may inform the engagement operator about its incapability to engage some threats that would require a re-allocation or some threats may leak through. Thus, every threat may end up being assigned a weapon system in these methods, but every threat may not be engaged, as its assigned weapon system may not have enough resources at engagement time. This sequential disconnected decision making process has two disadvantages (1) Since actual weapon resource requirements have not been modeled in the first step, weapon systems may end up being assigned more threats than they can engage, and (2) consequently, there may be engagement delays and/or leaked threats (sub-optimal engagement).

In general, threats can be intercepted by a weapon system over a relatively wide time window. One then has the choice of engaging the threat as soon as possible or sometime later in this window of opportunity. Since the launch time, for example of a missile, is dependent on the chosen intercept time, the guidance resource requirement for any threat is time-dependent. Thus, by suitably selecting intercept times for threats, more threats can be potentially engaged by a weapon system than would be possible if all threats were chosen to be intercepted at the earliest opportunity. In other words, this time analysis could result in better utilization of weapon resources. It could also avoid assignments where more threats than a weapon system can simultaneously handle are passed to it. However, this analysis should be performed as part of the allocation algorithm before the threats are assigned to a weapon system. Inventive embodiments do so by modeling the engagement resources and temporal constraints of each weapon system during the optimal allocation computation process itself. In one embodiment, the inventive algorithm overcomes disadvantages of previous approaches by combining the first and second steps into a single decision step. Thus, it determines not only which threats to assign to a weapon system but also when to deploy them (e.g., launch interceptors) so that a pre-specified engagement objective is optimized. By doing so, each weapon system is only allocated threats that it can actually engage with maximal utilization of its resources. By suitably optimizing the engagement times, one can achieve a more effective battle management scheme even under heavy attack situations that seemingly outnumber weapon resources.

However, combination of the two steps introduces temporal dimension optimization into the asset allocation problem causing a combinatorial explosion in the solution space and resulting in a resource-constrained scheduling problem that can be called Weapon Allocation and Scheduling problem (WAS). The WAS problem is a significantly more computationally expensive problem than the static WTA problem tackled in previous approaches. In addition, when time is treated as a continuous variable rather than being divided into finite discrete intervals, the problem becomes a mixed integer problem (both discrete and continuous variables). Inherent complexities in the problem of determining a schedule include limited resources, time windows during which particular activities must occur, and complex interdependencies of various tasks and resources. The number of candidate schedules increases exponentially with the number of threats that need to be engaged. The WAS problem is the search over the candidate schedules for a schedule that maximizes cost function while satisfying all constraints.

Since one of the objectives is to provide real time weapon assignment decisions (e.g., update times of at most few seconds), algorithms seeking exact optimal solutions to the WAS are impractical because of a combinatorial explosion in the number of possible allocation strategies. Thus approximate (or heuristic) algorithms are needed which can find good solutions with computational efficiency.

Exemplary embodiments described in detail below include merging and modifying simulated annealing and genetic algorithms, both of which are stochastic methods that are relatively simple and robust and can find the global minimum with a high probability. The inventive algorithm is a hybrid genetic algorithm that uses a true genetic algorithm and merges it with a simulated-annealing type algorithm. The engagement objective in the genetic algorithm is to optimize the assignment of weapons to targets. Given a set of targets assigned to a weapon, the simulated annealing algorithm finds a near optimal schedule of weapon engagements to maximize the expected kills or assets saved. Inventive embodiments can also include a novel heuristic measure in the temporal optimization algorithm that provides a fast, but approximately optimal, solution with significant reduction in the computational cost. The allocation and scheduling can also be made available to the engagement operator as a Just-In-Time (JIT) solution. While the deployment times calculated by the algorithm guarantee that weapon resource requirements will not be exceeded (for all weapon resources that have been modeled), the final decision on when to deploy and engage threats may be left to the weapon system.

Figure 3:
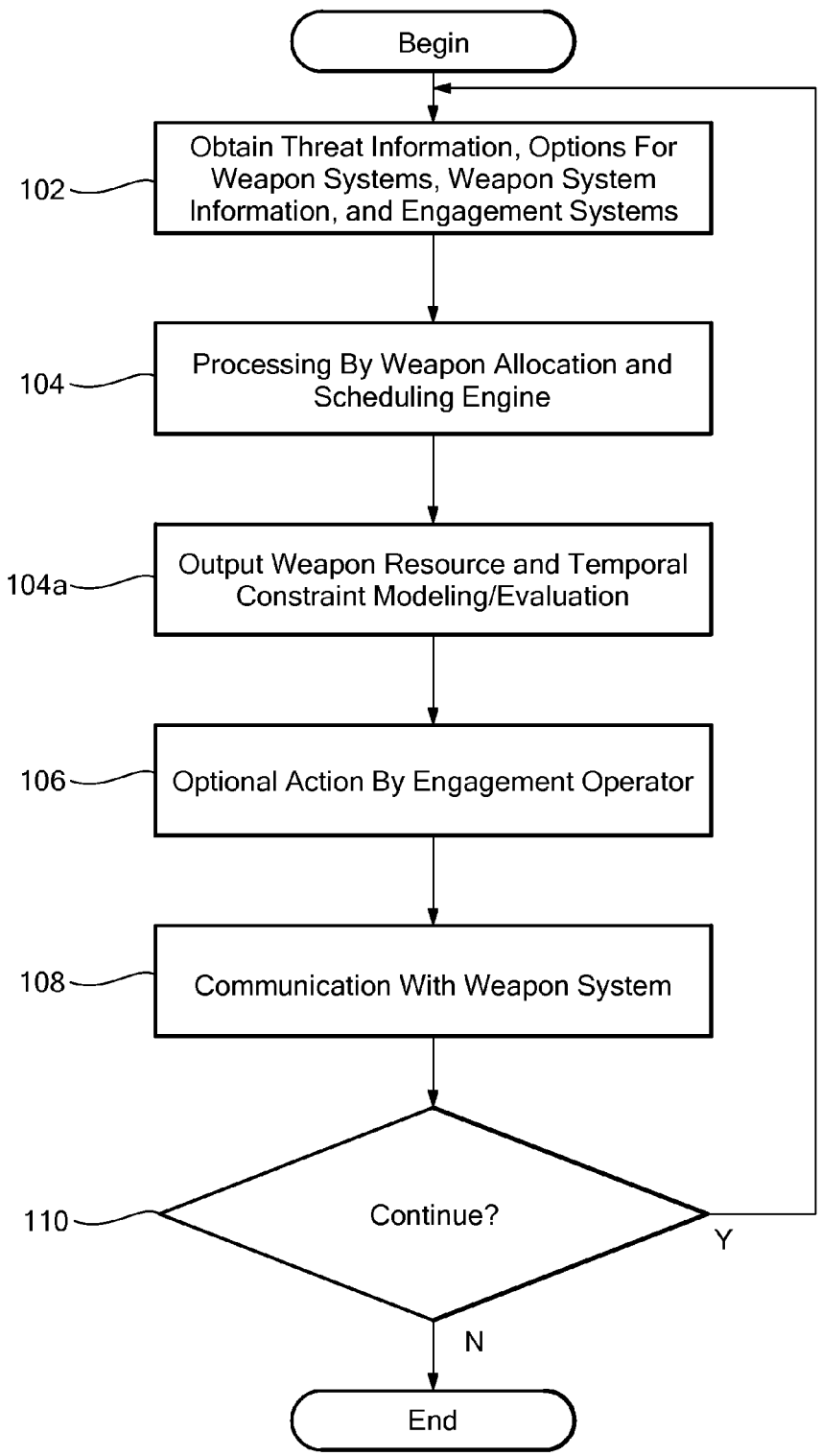
FIG. 3 is a flow diagram showing an exemplary sequence of steps to implement weapon allocation and scheduling in an exemplary embodiment.

FIG. 3 shows an exemplary sequence of steps to generate weapon-target assignments in accordance with exemplary embodiments of the invention. In step 102, information is read from tables, for example, to obtain threat and weapon information and engagement rules for the current battlespace. Information about threats is contained in a threat table, such as that shown in Table 1 below.

TABLE 1

Threat table example

| Threat number | Threat value |
|---|---|
| 11 | 20 |
| 20 | 65 |
| 31 | 80 |
| 42 | 5 |
| 55 | 95 |

A threat is an entity that is considered to be hostile by the commander and assigned a finite threat value by the threat evaluation module in a manner known to one of ordinary skill in the art. Typically a track-file and information about defended assets are used to evaluate the danger posed by the incoming threats. The information about incoming threats is usually available in the form of a track-file. Generally threats are detected by one or more sensors and additionally fused with other data to identify it as friendly or hostile. Track information such as position and velocity is also contained in this track file. Position and value of defended assets is contained in the defended asset table. This information is used to determine the danger posed by an incoming threat. Typically, the threat trajectory is used to predict its impact point or heading direction. Based on the defended assets in the neighborhood of the predicted impact point, a value is assigned to this threat. Thus, threats headed towards important military assets are assigned a higher threat value. Other factors such as proximity, time-to-impact, type and expected load of the threat is also taken into consideration in deciding a threat value. Each active threat will be represented by a row in the threat table, where each row will contain the following fields: Threat number, Threat value. The threat number is a unique identifier, such as a track number. The threat value will be an integer in the range 0-100, for example, with higher values signifying more damaging threats. High-payoff threats (HPT) are defined as threats with threat values exceeding a pre-determined threshold. Engagement of HPTs could be a high priority in the scheduling process and in some cases a high enough priority to require them to be engaged even at the expense of the overall objective function optimality.

In one embodiment, a battlespace analysis module 18 (FIG. 1) uses the track file and information about weapon systems to perform trial-intercept calculations to determine which weapon system can engage a threat. A weapon system is basically a weapon platform with one or more launchers and one or more tracking/guidance sensors. The weapon model used includes weapon system parameters such as weapon system location, type of interceptor, range of interceptor, etc. that determine if and when the weapon system will be able to engage and intercept a specific threat. Weapon systems that can potentially engage a threat become options for engaging that threat. The battlespace analysis module 18 generates a table that lists capable options/ways to engage each active threat. An option comprises a weapon system and the corresponding earliest and latest possible intercept time. Since each intercept time corresponds to a launch-time calculated by the battlespace analysis module, it is preferred to store the earliest and latest launch (deployment) times in the option table. Alternatively, intercept times can be stored directly with a look-up table that gives the launch time of an interceptor for every intercept time. This embodiment assumes that the launch times will be in the option table. Thus, if the weapon system deploys an interceptor anywhere in this launch time window it will be able to intercept the threat. In addition, this embodiment assumes that a resource guidance time parameter will also be provided with each option. This parameter indicates the time window beginning at launch time during which the weapon system's ground based sensor needs to guide the interceptor. Note that other time-dependent resource constraints such as weapon reload and slew time can be incorporated in the option table as well. An exemplary option table is shown below in Table 2.

TABLE 2

Option table example

| Threat number | Weapon number | Earliest launch time | Latest launch time | Guidance resource time duration | Option weight | Phase |
|---|---|---|---|---|---|---|
| 11 | 10 | 75 | 95 | 10 | 10 | Unscheduled |
| 11 | 20 | 48 | 62 | 10 | 20 | Unscheduled |
| 11 | 30 | 50 | 84 | 10 | 30 | Unscheduled |
| 20 | 20 | 105 | 125 | 10 | 50 | Unscheduled |
| 20 | 40 | 100 | 150 | 10 | 30 | Unscheduled |
| 31 | 40 | 80 | 95 | 10 | 30 | Unscheduled |
| 42 | 10 | 10 | 30 | 10 | 20 | Unscheduled |
| 42 | 30 | 15 | 43 | 10 | 10 | Scheduled |
| 42 | 40 | 12 | 35 | 10 | 80 | Unscheduled |
| 42 | 50 | 12 | 40 | 10 | 65 | Unscheduled |
| 55 | 20 | 60 | 90 | 10 | 80 | Committed |

Each option for a threat is given in one row of the option table and contains the following fields: Threat number, Weapon number, Earliest launch time, Latest launch time, Guidance resource time duration, option weight, and Phase. It is expected that options for a threat will occupy consecutive rows in the option table, though a general table can be sorted to correspond to this format. Options for a threat in the option table meet or exceed a minimum probability of kill ($P_k$) for that threat. This implies that all options for a threat are considered effective against that threat from the scheduler's perspective. However, each option will have a weight (range 0-100), with higher weights signifying more desirable options. These weights are decided based, for example, on a commander's preference, e.g., weights may be decided based on probability of kill ($P_k$) or on maximum range of the weapon. Whenever possible, the WASE should choose the option with the highest weight for all threats. Each option will also have a phase, which indicates the status of the option in the previous cycle schedule. Exemplary phase values include unscheduled, scheduled, committed or denied, which are described further below.

Each of the threats has at least one option or weapon system that can effectively engage it. Several threats have multiple options (e.g., Threat number 11 has 3 options, Threat number 42 has 4 options). The earliest and latest launch or deployment time for each option are given in columns 3 and 4. Column 5 gives the guidance resource time window for each option. For example, weapon system 10 can successfully intercept threat number 11 (row 1) if it is deployed anytime between 75 and 95 sec. Column 5 of Table 2 indicates that if the interceptor were launched at any of the launch time between 75 and 95 sec, weapon system 10 would need to commit one of its sensors to guide the interceptor during the first 10 sec of its flight towards threat number 11. Other resource constraints can be similarly modeled.

The weapon system status will be indicated with a set of parameters in the form of a weapon table, such as the illustrative Table 3.

TABLE 3

Weapon Table example

| Weapon number | Interceptor inventory | Max. guidance capacity | Number currently guided | Begin time-1 | End time-1 | Begin time-2 | End time-2 |
|---|---|---|---|---|---|---|---|
| 10 | 12 | 5 | 0 | | | | |
| 20 | 15 | 5 | 2 | 20 | 30 | 17 | 37 |
| 30 | 3 | 9 | 1 | 12 | 22 | | |
| 40 | 30 | 9 | 0 | | | | |
| 50 | 10 | 9 | 1 | 15 | 35 | | |

The weapon table contains information about the weapon inventory and how many threats are currently being engaged. Weapon systems within the force will not be static since weapons can move on the battlefield, change inventory information, update operational status at any time. Parameters for each weapon system will be described in one row of the weapon table, where each row contains the following fields: weapon number, number of available interceptors, maximum guidance capacity, number of currently guided missiles, and {begin time window, end time window}. Additional resource capacities can also be included in the table. Note that the {begin time window, end time window} parameters will be given for each interceptor currently being guided by the weapon system. It is assumed in this embodiment that the reload time of a weapon system is zero. Thus, all weapon systems can fire multiple rounds simultaneously. Launcher reload time is an example of an addition resource constraint that could be modeled using the method.

Engagement rules and objective are read from the engagement rule file. This includes information about the allocation strategy (e.g., shoot-shoot-look vs. shoot-look-shoot, salvo attack, load balancing), different objectives that need to be met such as maximize threats neutralized, always engage HPT's, etc.

Referring again to FIG. 3, in step 104 weapon allocation and scheduling is computed. The system determines whether or not all active threats in the threat table can be engaged at some future time based on current battlespace conditions and resource usage. If all threats cannot be engaged, it determines the weapon-threat pairing that maximizes some objective function. The objective function is based on the engagement rules and objectives. It could be either a single objective function or multiple objective functions. As an example of multiple objective functions, one engagement objective could be to engage maximum total threat value, while a second simultaneous objective could be to maximize the weights (probability of kill or other measure) of the options in the weapon-threat pairing. The engagement rules and weapon systems used also govern other features and constraints of the problem, such as allocation strategies (shoot-shoot-look vs. shoot-look-shoot, salvo attack, load balancing) and time-dependent resource constraints (weapon reload and slew time, guidance requirements, etc.). The illustrative embodiment describes a "shoot-look-shoot" scheme where only one weapon system is assigned to a threat to engage it at some future time. Those of ordinary skill in the art will understand that the proposed invention can be easily extended to "shoot-shoot-look" and other strategies. The illustrative embodiment also assigns or selects only one option or weapon system for each threat (no salvo attack), though multiple threats may be assigned to a single weapon system. Other embodiments can be readily applied to salvo attacks with minor modifications to the objective function. In addition, the only time-dependent resource modeled in this particular embodiment is the guidance resource with its associated capacity and constraints. Other resource constraints can be incorporated in the same framework.

In order to arrive at the optimal target-weapon pairing, the algorithm models the resource and temporal constraints of the weapon system in step 104a. It uses these constraints to determine the optimal launch times for each threat in the selected threat subset as well. In other words, the algorithm computes the engagement schedule for each weapon system that specifies when each threat should be engaged. This combination of weapon-threat pairing and launch times is the output from 104. The output pairing and schedule satisfies all modeled temporal and resource constraints of the battlespace. Temporal constraints are that the launch time for engaging the threat by a weapon system must be between the earliest and latest launch times listed in the option table. Resource constraints are that 1) the total number of threats assigned to each weapon system should not exceed the number of available interceptors at each weapon system (weapon inventory resource) and 2) the number of simultaneously guided interceptors (function of launch times) required to engage threats assigned to each weapon system should not exceed its maximum guidance capacity (weapon guidance resource).

The optimal weapon allocation and schedule is passed to the optional engagement operator in step 106. The engagement operator can take action as desired, as described more fully below.

One aspect of the present invention is that the output from step 104 is a new instantiation of the input option table read in step 102. The fields altered in step 104 in the option table are option phase and begin launch time. The option phase indicates the status the options or weapon systems for each threat. The following phases are used:

Unscheduled Threat is either new or has not yet been paired with this weapon system (option not selected).

Scheduled Threat has been paired with a weapon system (option selected) and presented to but the weapon system has not yet been assigned this threat for future engagement Committed Threat has been committed to a weapon system (option committed)

Denied Option has been rejected by the engagement operator

Note that only threats that are not currently engaged or killed are listed in the threat table and option table. If in step 104 there was a pairing of a threat with one of its weapon systems (options) as part of its optimal allocation and scheduling, then the phase of that option becomes scheduled. The begin launch time value of that option row is changed to the optimized launch time computed by 104 as well. Note that in this embodiment each threat is assigned to either none or only one option (weapon system). Thus, only one option per threat can be in the scheduled or committed phase and all other options will be in the unscheduled or denied phase.

The role of the optional engagement operator in step 106 is to use the allocation and schedule output (modified option table) to determine the time that a weapon system should be committed to its assigned threat(s). The engagement operator may also decide whether or not to accept the assignment. Since the allocation is a plan for the future, several threats may still be a long time away from reaching the engagement zone of the defensive weapons they have been assigned to. For these threats, the operator may simply wait until the launch time approaches and then commit the weapon system to the threat. The operator can take a "wait and see" approach in order to allow flexibility in the schedule. If the threat changes course, a different weapon system may need to be assigned and ultimately tasked. Thus, the operator could wait for some time before committing a weapon system (passing threat number and suggested launch time message to the weapon system). During this period, the option is in the scheduled phase. After the weapon system has been informed, the option phase is changed to committed. The operator may additionally deny certain weapon assignments in case of changes in engagement rules, weapon status, etc., during the time taken by 104 to find the optimal allocation. Thus the option table could have a mixture of unscheduled, scheduled, committed and denied options. Note that as soon as a weapon system deploys its interceptor to engage a threat, the weapon system informs the source creating the threat table to remove this threat from the threat table. This threat is not considered active and not included in any future planning and scheduling. However, if feedback about a threat status is received and the threat was not neutralized, then it may be put back in the threat table by the source creating the input table. The WASE in step 104 will then do the planning for this threat (as if it were a new threat). Thus a currently engaged threat will not show up in a threat or option table. However, if an interceptor is currently being guided towards the threat by a weapon sensor, then the guidance resource timings will be included in the weapon table.

Depending on the rules of engagement, the engagement operator could take a less active role in approving engagements or not role at all. For example, the engagement operator could retain a capability to override engagement decisions made by the algorithm, but allow the algorithm to directly commit weapons for engagements that are not overridden.

In step 108, commit messages are received by the weapon systems. The weapon systems then prepare to engage the threats assigned to them. Step 108 includes engaging the threats and updating the weapon table.

The sequence of steps in FIG. 3 is an iterative process that is executed at either a fixed rate or whenever the battlespace situation has changed enough (e.g., new threats, change in number of available weapon systems, change in engagement tactics, etc.). When the algorithm is executed, the WASE keeps the previous assignment and schedule in perspective while arriving at or re-planning a new assignment and schedule. One aspect of the invention is in its capability of smart dynamic re-planning with minimal retasking. Minimal retasking implies that the changes to previously planned assignment and schedule will be minimal so as to not cause reassignments and rescheduling on every run that can be both confusing and impractical. In an exemplary embodiment, minimal retasking is achieved by use of the option phase field.

Each time re-planning needs to be performed, the system begins processing in step 102 by reading the threat, option and weapon table. As described above, the phase of the option is listed in the option table (see Table 2). In the first run through the system, all options will be in unscheduled phase. In later runs, if the threat is a new threat or it has not been paired with any weapon, then all of its options will be in the unscheduled phase. If an option was selected in the previous run (by WASE) and the engagement operator did not commit it (as launch time was too far into the future), then the option phase will stay scheduled. However, the battle-space analysis module will be allowed to re-compute the intercept time windows and change the begin and launch time values in creating the option table. If the engagement operator commits an option, then the phase of the option will be changed to commit. In this case, the battle-space analysis module will not re-compute or change the launch time fields in the option table for this option. Similarly, if the operator denies this option, then the phase will be changed to denied. The option phase is used to determine the re-planning algorithm based on the engagement rules and commander's guidance.

An example of the engagement rules could be as follows: Scheduled options can be re-planned (changed to unscheduled) if a better objective can be attained. Thus, if new threats have appeared and the overall engagement objective can be optimized by reassigning weapons previously scheduled for older threats to new threats, then re-planning is allowed. In other words, if an option is scheduled for a threat, then that threat can be either not assigned any weapon (all options unscheduled) or assigned to a new weapon (different option scheduled) in the new schedule. Thus, scheduled options are treated similarly to unscheduled options from a re-planning perspective.

Committed options cannot be re-planned, unless specified differently in the engagement rules. When an option is committed, it means that the weapon system has been instructed by the operator to engage this threat and the weapon system is preparing to engage it. Generally, once a weapon system has been committed to a threat, it should be allowed to go ahead unless extreme conditions arise (specified as an engagement rule). An example of such a condition is if an existing or a new threat becomes a high-payoff threat, this weapon system is the only one that can effectively engage and neutralize it, and the weapon system cannot engage both threats. In such a case, changing the engagement decision by this weapon system may be the only way to be able to engage the HPT. The re-planning algorithm handles this situation automatically based on the engagement rules. If it determines that the objective function (hard constraint to engage all HPT's and maximize threat value of all other threats) is maximized with a new allocation and schedule where the commit option is changed (to unscheduled) and the HPT option is scheduled, then it will choose this re-planning. Note that while the commit option has been unscheduled making the weapon stop its preparation for engaging the threat, the new allocation may have still scheduled an alternate option for this threat (if it had more than one option in the option table) if there was still an opportunity to intercept it with this alternate option.

Denied options will not be included in any further allocation and scheduling.

Thus, the dynamic scheduling is carried out based on the option phase of all threats, previous schedule, and engagement rules. One way to achieve minimal retasking is to assign extra weight to options that are in the scheduled phase. Additionally scheduled options are always included in the initialized trial option configuration population chosen by the genetic algorithm. These factors result in a much higher probability that the previous assignment is maintained in the current assignment as well, unless a new assignment with an improved objective function is found.

The WAS problem is to calculate the optimal weapon allocation and scheduling subject to temporal and resource constraints. The objective function is based on the engagement rules and tactics. The algorithm can use either a single objective function or multiple objective functions. As an example of multiple objective functions, one engagement objective could be to engage maximum total threat value, while a second simultaneous objective could be to maximize the weights (probability of kill or other measure) of the options in the weapon-threat pairing. The engagement rules and weapon systems govern other features and constraints of the problem, such as allocation strategies (shoot-shoot-look vs. shoot-look-shoot, salvo attack, load balancing) and time-dependent resource constraints (weapon reload and slew time, guidance requirements, etc.).

An illustrative embodiment describes a "shoot-look-shoot" scheme where only one weapon system is assigned to a threat to engage it at some future time. The system can be easily extended to handle "shoot-shoot-look" strategies as well. In one embodiment, the system assigns or selects only one option or weapon system for each threat (no salvo attack), though multiple threats may be assigned to a single weapon system. It can be applied to salvo attacks with minor modifications to the objective function. Temporal constraints are that the launch time for engaging the threat by a weapon system must be between the earliest and latest launch times listed in the option table. Resource constraints are that the total number of threats assigned to each weapon system should not exceed the number of available interceptors (weapon inventory resource) and the number of simultaneously guided interceptors (function of launch times) should not exceed each weapon system's maximum guidance capacity (weapon guidance resource). Note that the only time-dependent resource modeled here is the guidance requirements of a weapon system. Other resource constraints can be incorporated in the same framework just as easily.

The problem and the constraints can be described in a mathematical formulation as follows. Let $L(i, j, k)$ be a Boolean variable=1 if k denotes the launch time for an interceptor from weapon system j to engage threat i, else=0. Note that while number of threats and weapon systems are small finite numbers, the time quantity is a continuous variable starting from the current time to some future time. The time interval in consideration depends on the intercept times of the threats. If several threats are several minutes from being engaged, then those threats may not even be included in the threat and option tables. It is assumed that all threats that belong to the threat table are to be considered in weapon planning and scheduling for the future. Alternatively, the future time interval for which the algorithm should do planning and scheduling can be included as one of the engagement rules. Otherwise, the launch time of an interceptor against the farthest threat in the table determines the length of future time interval. Typically this time interval is broken into discrete numbers with a small step size (chosen as 1 sec in present embodiment). Let us further denote:

| | |
|---|---|
| $I =$ | Number of current threats (in threat table) |
| $J =$ | Number of current weapon systems (in weapon table) |
| $K =$ | Total number of time points in time interval (for which planning needed) |
| $L =$ | Total number of own assets |
| $TV(i) =$ | Threat value of threat i |
| $OW(i, j) =$ | Option weight of weapon system j for threat i |
| $AV(l) =$ | Asset value of asset l |
| $LB(i, j) =$ | Begin launch time for weapon system j for threat i |
| $LE(i, j) =$ | End launch time for weapon system j for threat i |
| $GT(i, j) =$ | Guidance time interval for interceptor for weapon system j to engage threat i |

-continued

| | |
|---|---|
| IR (j) = | Inventory resource of weapon system j (number of interceptors) |
| GR (j) = | Guidance resource capacity of weapon j |
| Ω (i, l) = | Probability that threat i kills asset l |

The engagement objective for the WAS-TKM problem is to maximize the threat value engaged using the highest possible weighted options for each threat. Note that objective functions to handle secondary damage to incoming threats as well as using multiple weapon systems against the same threat can be easily used in the same framework. These are actually dual objectives, but we have chosen a single objective function as a weighted sum of these objectives. Generally, the threat value term is given a much higher weight and its weighting could be available as an engagement rule. So, the objective function is to maximize Equation 1 below:

$$E = \sum_{i=1}^{I} \sum_{j=1}^{J} \sum_{k=1}^{K} [\alpha TV(i) + (1-\alpha)OW(i,j)]L(i,j,k) \quad (1)$$

subject to the following constraints $$\sum_{j=1}^{J} \sum_{k=1}^{K} L(i,j,k) \leq 1 \quad \forall i \quad (2)$$

$$\sum_{i=1}^{I} \sum_{k=1}^{K} L(i,j,k) \leq IR(j) \quad \forall j \quad (3)$$

Constraint (2) is that each threat will be assigned to zero or only one weapon system. Constraint (3) is that the total number of threats allocated to each weapon system should not exceed its current inventory resource (number of interceptors). Note that the above constraints do not include the constraint that the maximum number of interceptors being guided at any time should not exceed each weapon system's guidance resource capacity. We can pose this constraint using a new matrix R whose entries are again Boolean and can be completely derived from L as shown below:

$$\text{If } L(i,j,k) = 1, \quad R(i,j,k') = 1 \quad \forall k \leq k' \leq k + GI(i,j) \quad (4)$$

$$\sum_{i}^{I} \sum_{k}^{K} R(i,j,k) \leq GR(j) \quad \forall j \quad (5)$$

As mentioned before, the above assumes that guidance is needed during the first GI(i,j) seconds after launch for an interceptor from deployed from weapon system j to engage threat i. Other types of guidance requirements will be formulated as a different mathematical constraint, but the same algorithm can be used. Note that one can add other time-dependent resources such as weapon reload and slew time as multiple constraints in the above framework as well. In the form that the problem is posed above, the total number of exhaustive possible combinations that satisfy constraint (2) are $(JK)^I$ The number of combinations that satisfy constraint (3)-(5) will be significantly less during tight-resource conditions.

A naive solution to the above problem would be to find the optimal L (i, j, k) (i.e., how and when to engage a specific threat) such that objective function (1) is optimized subject to constraints (2)-(5). However, this will require solving a problem with a relatively large search space. The search space can be reduced by using the fact that weapon system resource constraints (both IR and GR) for each weapon are independent of other weapon systems. However, to exploit this fact and implement it in an algorithm, we reformulate the above resource-constrained scheduling problem and propose a two-step approach. In the first step, we ignore the time component and only address the problem of assigning a weapon system to a threat. The number of possible ways of assigning I threats to J weapon systems is $J^I$. This is akin to a static target-weapon allocation problem that is simple combinatorial optimization problem with constraints. In the second step, we determine whether the combination or pairing in the first step satisfies all constraints and optimize the launch times such that the highest threat value that can be engaged. If such a combination of launch times cannot be found for all threats, then we try to find the combination of launch times for the threat subset with the highest total threat value amongst all other subsets that can be successfully engaged. In other words, this threat subset should not only have maximum total threat value, but corresponding launch times should meet the temporal and resource constraints. The optimal launch times computed from the second step determine which of the threats can be engaged and thus affect the value of the objective function. Note that the two steps are not sequential, but the second step is embedded in the first step and has to be executed for every pairing generated in the first step. The overall assignment with the highest objective function then becomes the optimal assignment.

One aspect of the two-step approach is that we can now solve the temporal optimization problem for each weapon system independently of all other weapon systems. This approach depends on the fact that each weapon system resource constraints (both IR and GR) are independent of other weapon systems. The additional advantages of this two-step approach include:

1. There may be many launch time combinations that give the optimal solution (all engaged threats) when only considering threats assigned to a specific weapon system. Thus solving the launch time optimization problem separately from the assignment problem (even though one affects the other) reduces the computational cost compared to the naive approach that solves for both in a single step; and
2. It allows the use of different methods for the two steps. We use a genetic algorithm approach for step 1 and a simulated annealing type method for step 2.

Notwithstanding the two-step approach, each of the optimization problems still has a significant search space even for a modest number of threats, weapon systems, and time points. Complexity comes from the fact that the second step (solving the time optimization problem) has to be performed for each combination analyzed in the first step. Thus, the computational cost of the second step is of interest. An inventive heuristic method breaks the second step further into a two-step approach whose solution is approximately close to the solution of the original problem (of the second step), but has a significantly lower computational cost. The objective function of the WAS-ASM problem is to maximize the total value of asset survival and is given below. Probability that threat i survives weapon attack is:

$$P_s^i = (1-p(i,j))^{M(i,j)}$$

where p(i,j) is the kill probability of threat i by weapon j and M(i,j) is number of interceptors launched by weapon j towards threat i.

$$\text{Total value of survived assets} = \sum_{l=1}^{L} V_l P(A_l)$$

Probability of survival of asset k is $$P(A_1) = \prod_{i=1}^{I} (1 - \Omega(i, l) P_S^i)$$

$$\text{where} \begin{cases} P_S^i = (1 - p(i, j))^{M(i,j)} & \text{if threat engaged,} \\ P_S^i = 1 & \text{if threat not engaged} \end{cases}$$

This problem is solved in a similar two-step approach as outlined above for WAS-TKM. One difference is that in the second step we determine the engageable threats such that the asset survival is maximized. When multiple threats may be headed towards the same asset, even a single leaked threat may cause severe damage to the asset. In other words, we need the set of engageable threats (without violating any resources) that yields the highest survived asset value. This requires solving a problem that is no longer independent for each weapon system. In general, WAS-ASM is more difficult and computationally expensive than the WAS-TKM.

Properties of the WAS problem include:
1) NP-complete (i.e., one must essentially resort to complete enumeration to find the optimal solution),
2) Mixed-integer, i.e., both discrete and continuous variable (while weapons are either assigned to or not assigned to a target, the time of assignment may be continuous),
3) Large-scale (the number of weapons and targets could be large, making enumeration technique impractical),
4) Dynamic (solutions need to be quickly recomputed based on modified engagement rules or changing battle scenarios),
5) Real-time (solutions must be generated in quick update cycles close to real-time). Properties 1-3 above of the problem reduce the likelihood of obtaining algorithms that are both efficient and optimal.

As described before, we have developed a two-step algorithm where the second step is embedded in and implemented for every trial pairing of the first step. Both steps use a fast heuristic algorithm to arrive at an approximately optimal solution. A brute-force approach of evaluating the objective function of every possible assignment is impractical since the number increases exponentially with the number of threats and weapon systems. In order to arrive at an optimal or close-to-optimal solution in the allowed time (typically a few seconds), we have developed a hybrid genetic algorithm for the first step. We have used a genetic algorithm because of its simplicity of implementation and robustness. This requires determining the value of the objective function for a set of trial combinations and constraint checking. The value of the objective function will not only be determined by which weapon system is paired with which threat, but also by the launch time. Thus, launch times need to be optimized to find the maximum objective function value and satisfy all constraints. This optimization is done in the second step by an inventive simulated annealing type algorithm. Since we have a simulated annealing type algorithm embedded in a genetic algorithm, we have termed the overall algorithm as a hybrid genetic algorithm.

As is known in the art, genetic algorithms (GA) are search methods that heuristically 'mimic' biological evolution (namely, the process of natural selection and the 'survival of the fittest' principle). They apply an adaptive search procedure based on a 'population' of candidate solution points. An individual stands for a point of the search space and is associated with a fitness. In the current context, an individual is an option configuration (see below) and a population is a collection of option configurations. The algorithm iteratively builds new generations of populations that evolve through selection, crossover and mutation. Selection favors high fitness individuals whereas crossover and mutation ensure an efficient exploration of search space. Each iteration involves a competitive selection that drops the poorer solutions. The candidates with higher 'fitness' are then 'recombined' with other solutions by swapping components with another; they can also be 'mutated' by making a small change to a single component of a candidate. The recombination and mutation moves are applied sequentially, to generate new solutions that are biased towards regions of the solution space in which good (though not necessarily globally optimized) solutions have already been found.

Figure 3A:
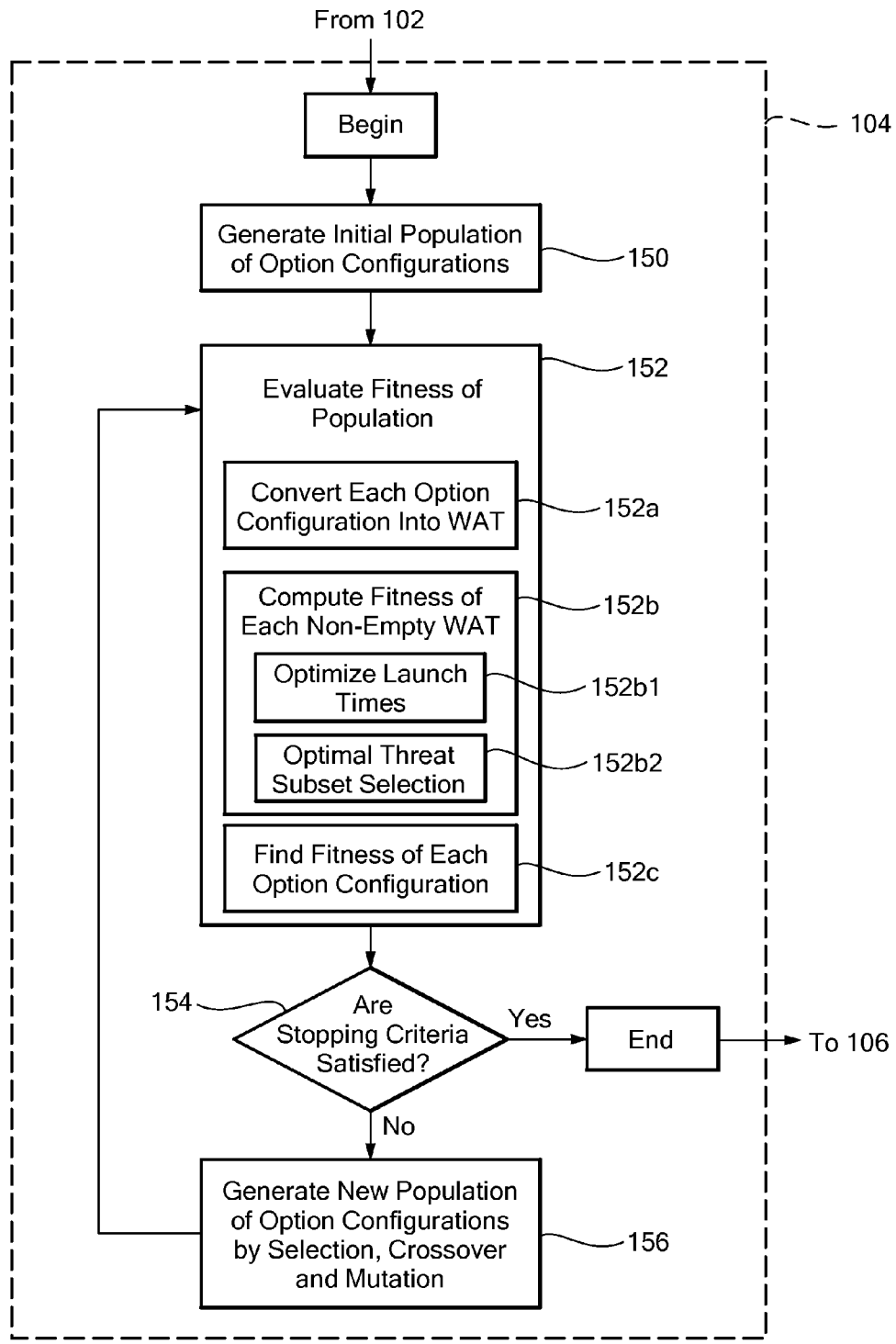
FIG. 3A is a flow diagram showing exemplary processing performed by a weapon allocation and scheduling engine.

FIG. 3A shows a high flow diagram of processing performed by the WASE. In step 150, an initial population of option configurations (OCs) is generated. In step 152, the fitness of the population is evaluated. In sub step 152a, each OC is converted into a weapon assignment table (WAT). A further substep 152b to computer the fitness of each non-empty WAT includes optimizing launch times in sub step 152b1 and optimizing threat subset selections in sub step 152b2. The fitness of each OC is determined in step 152c. In step 154, it is determined whether predetermined stopping criteria are met. If so, processing proceeds to the engagement operator in step 106 of FIG. 3. If not, in step 156 a new population of OCs is generated, such as by selection, crossover, and mutation in a genetic algorithm. The steps above are described more fully below.

Figure 4:
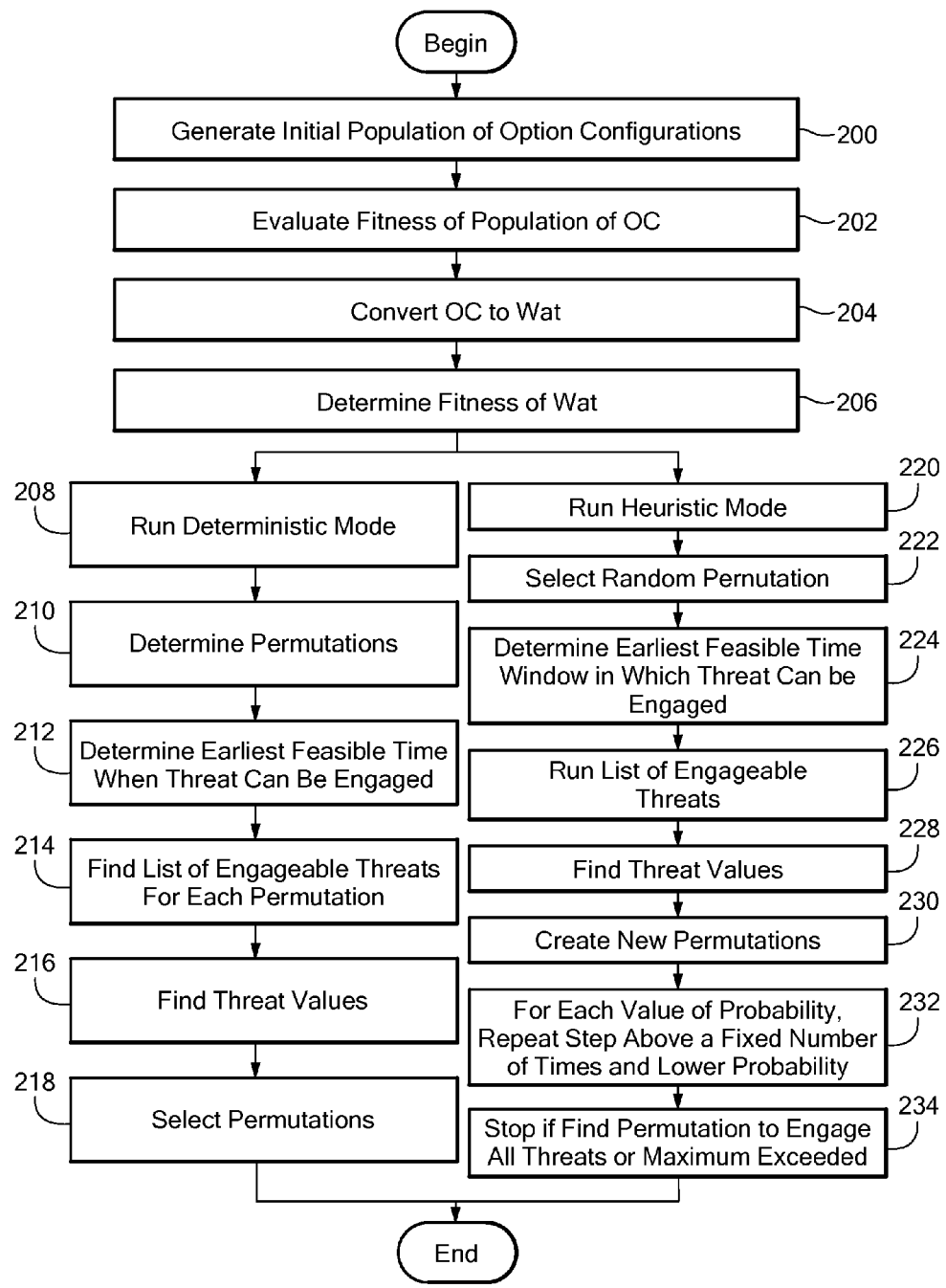
FIG. 4 is a flow diagram showing an exemplary sequence of steps to implement weapon allocation and scheduling running in a deterministic mode and/or a heuristic mode in accordance with an exemplary embodiment.

A shown in FIG. 4, in step 200, the algorithm begins with creating an initial population of option configurations. This is basically the first step of the genetic algorithm that creates a population of candidate solutions from the search space. An option configuration (OC) is defined as a table that contains one and only one option (from the option table) for each threat. Let us assume a total of I threats numbered as i=1, 2, 3 ... I. In the example Table 1, we have I=5 threats. Each threat can be engaged in a finite number of ways or options. We denote the number of options for each threat by $N_i$, where $N_i$ is a finite positive integer. In Table 2, $N_1=3$, $N_2=2$, $N_3=1$, $N_4=4$, $N_5=1$. The total number of option configurations for the above problem size is $N_1 \times N_2 ... \times N_I=24$. Table 4 gives an example option configuration formed by randomly picking one option (row) for each threat from Table 2.

TABLE 4

Option configuration example

| Threat number | Weapon number | Earliest launch time | Latest launch time | Guidance resource time duration | Option weight | Phase |
|---|---|---|---|---|---|---|
| 11 | 30 | 50 | 84 | 10 | 30 | Unscheduled |
| 20 | 20 | 105 | 125 | 10 | 50 | Unscheduled |
| 31 | 40 | 80 | 95 | 10 | 30 | Unscheduled |

TABLE 4-continued

Option configuration example

| Threat number | Weapon number | Earliest launch time | Latest launch time | Guidance resource time duration | Option weight | Phase |
|---|---|---|---|---|---|---|
| 42 | 30 | 15 | 43 | 10 | 10 | Scheduled |
| 55 | 20 | 60 | 90 | 10 | 80 | Commit |

In order to code an OC as a chromosome or an individual of the population, we use a simple notation. If we choose option number k for threat i ($1 \leq k \leq$ number of options for threat i in option table), then we code its gene as k. We similarly code genes for all threats based on the option number selected in the OC. The string of genes of length equal to the number of threats then represents the OC. We always include two non-random OC's in this initialization step, while the remaining are chosen randomly. The two non-random OC's are:

1. An OC that is based on choosing the option with the highest option weight for all threats.
2. An OC that is based on choosing the scheduled or commit options for all threats In step 202, the fitness of each OC is determined. The fitness of each OC is dependent on the objective function that we are trying to optimize. The approach for computing this fitness efficiently and optimally is one aspect of the invention. We now show the inventive methods for computing the fitness for the TKM and ASM battle management objectives.

The fitness depends on which threats can be engaged by its chosen weapon system(s) and the option weights of these weapon systems. In one embodiment, we define the fitness of an OC as the weighted sum of two measures (1) Sum of threat values of all engageable threats (SOT), and (2) Sum of Option Weights of the options of these engageable threats in this OC (SOW). If all threats can be engaged (to be determined based on optimizing launch times and determining if combinations of launch times for which no resources constraints are violated can be found), then SOT is simply the sum of threat values of all threats. For example, if all threats are determined to be engageable, then SOT for the OC in Table 4 is 265 and its SOW is 200. The fitness of the OC can be denoted as $\alpha*SOT+(1-\alpha)*SOW$, where $\alpha$ is a parameter that could be listed as an engagement rule. For $\alpha=0.95$, if constraint satisfying launch times for each weapon system against all its threats can be found (i.e., all threats are engageable), the fitness of above OC=261.75. However, the launch times need to be optimized before this can be determined.

In order to determine the fitness of the OC, it is straightforward to organize threats in the OC by weapon systems and solve the problem separately for each weapon system.

In step 204, the OC is converted to a weapon assignment table (WAT). Since an option for a threat is essentially a way to engage that threat by a specific weapon system, an OC can be translated into a weapon assignment table (WAT). A WAT for each weapon system lists the threats assigned to it for a specific OC. In the above example OC (Table 4), the weapon assignment table for weapon numbers 10 and 50 are empty since no option with these systems appears in the OC. Weapon systems 20, 30 and 40 have non-empty WAT. The WAT for weapon system 20 is shown in Table 5 below.

TABLE 5

Weapon assignment Table (WAT) for weapon system 20

| Threat number | Earliest launch time | Latest launch time | Guidance resource time duration | Option weight | Phase |
|---|---|---|---|---|---|
| 20 | 105 | 125 | 10 | 50 | Unscheduled |
| 55 | 60 | 90 | 10 | 80 | Committed |

In step 206, the fitness of the WAT is determined. The problem of determining whether all, or which subset, of threats can be engaged for an OC is now translated into determining the same for each WAT. This is a more direct problem as temporal and resource constraints need to be analyzed for each weapon system independent of other weapon systems. We define a new measure "fitness of WAT" as the total threat value of a WAT that can be engaged without violating any constraints. The output from this module is a list of threats that can be engaged and the corresponding launch times as well as the fitness of the WAT. The sum of the fitness of all non-empty WAT's then becomes the sum of threat values of all engageable threats (SOT) for the OC.

For each WAT, it may be possible to find some combination of launch times for which all threats can be engaged even with the weapon system's limited guidance capacity. If such a combination of launch times can be found, then the weapon system can be assigned all threats in its WAT and the WAT has maximum possible fitness (equal to the sum of threat value of all threats in the problem). If such a combination of launch times cannot be found for all threats, then it tries to find the combination of launch times for the threat subset with the highest total threat value (or another objective function) amongst all other subsets that can be successfully engaged (satisfies constraints). Thus, for each WAT, either a threat is chosen or not and for each chosen threat a launch time needs to be calculated such that (1) launch time is in the launch time window; and (2) guidance constraints are not violated. In other words, this threat subset should not only have maximum total threat value, but corresponding launch times should meet temporal and resource constraints. This is a constrained dual optimization problem.

It is known in the art, such as the '169 patent to Khosla that the WAT fitness can be determined by using a novel simulated annealing-type algorithm that approximates the problem by a single optimization problem followed by a simple sorting step. The approximation is close to the solution of the original problem because of the heuristics used in the sorting step. In the first step, one determines launch times for all targets such that the number of resource constraint violations is minimized. Resource constraint violation is defined as the condition in which the number of simultaneously guided interceptors exceeds the guidance capacity of the weapon system. While one has several ways to determine launch times for this minimization, a simulated annealing-type algorithm is used. In the second step, threats in the WAT are eliminated by a sorting procedure based on a heuristic (weighted violation value dependent on threat value and number of resource violations) to determine a final list of engageable threats with no violated resource constraints (exceed_sum is 0). The goal is to determine the number of remaining threats (threat subset) that do not exceed guidance capacity and have a total threat value which is greater than any other combination of remaining threats. While this approximation heuristic approach works quickly, the solutions are often sub-optimal since we are solving a dual optimization problem as a sequence of single optimization step and a sorting step.

In one aspect of the invention, we have developed heuristics to determine the WAT fitness that improve upon the previous approach discussed above. Determining the fitness of a WAT requires calculating the subset of threats with the highest total threat value (and their corresponding launch times) that satisfies all temporal and resource constraints. We have developed a fast algorithm to determine this threat subset. The new algorithm can be run in two modes—deterministic (steps 208-218) and heuristic (steps 220-234).

The deterministic mode is a brute-force approach that evaluates the entire search space and will provide the optimal solution (fitness of WAT). It should be used for small and medium sized problems (e.g., number of threats in a WAT between 1-6) and will be quite fast for such problems.

The deterministic mode operates as follows. In step 210, the system determines all permutations (orders) of threats in the table. Example: If a WAT has 3 threats with indices 1, 5, 7 in it, then the number of permutations is 3!=6 (permutations are 157, 175, 517, 571, 715, 751). In step 212, for each permutation, starting with the first threat and moving down the order, the system determines the earliest feasible time when the threat can be engaged (i.e., which satisfies temporal and resource constraints). If any threat cannot be engaged (no such time exists), then this threat is deemed unengageable in this permutation.

In step 214, the system finds the list of these engageable threats (for each permutation). In step 216, the system finds the threat value of the returned engageable threat list. And in step 218, the system selects the permutation with the highest threat value. This threat value is the fitness of the WAT.

The heuristic mode in step 220 uses a simulated-annealing type heuristic in an exemplary embodiment. Heuristic mode is faster than the deterministic mode but can yield sub-optimal solutions. This mode should be used for larger-sized problems.

As is known in the art, simulated annealing is a heuristic algorithm based upon the physical analogy of cooling crystal structures that spontaneously attempt to arrive at a stable (globally or locally minimal potential energy) equilibrium configuration. Simulated annealing is based on random evaluations of the objective function in such a way that transitions out of local minima are possible. Thus it relies on a neighborhood structure and a decreasing cost function to find a minimum. Specifically, local minima are avoided by using cost increasing transitions with a nonzero probability that avoids converging to local minima solutions. The acceptance of such transitions is judiciously controlled by a parameter called temperature, whose idea stems from the physical annealing process.

In the exemplary implementation, the basic idea behind simulated annealing is that instead of only selecting launch times that increase fitness, launch times that reduce fitness are sometimes accepted to prevent the search from getting trapped in local minima. The probability of acceptance is dependent upon a parameter called the temperature that is lowered as the algorithm proceeds. In its original form, the simulated annealing method is provably convergent (in a probabilistic sense), but is exceedingly slow; we have used an enhancement that makes it much faster. The algorithm swaps a random pair of threats and computes the launch times and fitness. If the fitness (sum of engageable threat values) of the new order is larger, it is always chosen. If the fitness after the swap is smaller, the algorithm accepts the swap with probability p. The algorithm is controlled by the probability p. Initially p is set to a high value to allow the search space to be explored and as the algorithm proceeds, it is reduced to make the search more localized.

In step 222, the system selects a random permutation (order) of threats in the table. In step 224, for this permutation, starting with the first threat and moving down the order, the system determines the earliest feasible time window in which a threat can be engaged (i.e., which satisfies temporal and resource constraints). If any threat cannot be engaged (no such time window exists), then this threat is deemed unengageable in this permutation.

In step 226, the system returns the list of engageable threats and in step 228 finds the threat value of the returned engageable threat list. In step 230, the system creates a new permutation by pair-wise swapping of randomly selected threats of previous configuration and repeats step 224 for this permutation. The system accepts the new permutation if it has higher WAT fitness than previous, else accept with a probability of acceptance that is analogous to the annealing temperature. In this version, the probability of acceptance is directly proportional to the annealing temperature (proportionality constant 1) and is thus used in lieu of the annealing temperature. In step 232, for each value of probability, the system repeats step 230 a fixed number of times (MAX_GENS) and then lowers probability according to a predetermined schedule. In step 234, processing stops if a permutation where all threats in the list are engageable is found or a maximum number of predetermined runs of step 232 have been exceeded.

Steps 212 and 224 are similar in the deterministic and heuristic steps described above and involves the following sub-steps:

Step 250 Each threat in a permutation has several parameters associated with it—earliest launch time, latest launch time, and guidance-duration time. For all threats in a permutation, find:
Minimum of earliest launch time (T1)
Maximum of latest launch time (T2)
Maximum of guidance duration time (T3)
Let T4=T2+T3.

Step 252 Discretize the time window from T1-T4 into bins of size ΔT (nominal value of ΔT=1s). Create a resource-usage (number of guidance resources used) vector of length=number of bins and initialize the resource-usage value of each bin to 0.
Example: If T1=50s, T4=100s, ΔT=1s, the resource-usage vector will be of length 50.

Step 252 Determine if there are currently engaged or tasked threats (from previous schedules) that are/will be using any guidance resources in time window T1-T4 and, if so, at what bins. Modify the resource-usage of these time bins accordingly. The resource-usage vector may now have values such as 0 0 0 0 1 1 1 0 0 2 2 2 0 0 1 1 1 1 1 0 0 0 0 . . . , where the resource-usage signifies the number of resources assigned in the corresponding time bin.

Step 254 If we denote the number of weapon guidance resources as N (this is a fixed number for a specific weapon type), then find all bins with resource-usage values that are less than N. These bins have available weapon guidance resources.

Step 256 For each threat (starting with first one in the permutation), find the earliest series of such consecutive bins such that first bin is between earliest and latest threat launch time length of bin series>=guidance duration of threat If such a bin series can be found, it implies that the threat can be engaged (satisfies both resource and temporal constraints). Otherwise this threat is deemed unengageable in this permutation.

Step 258 Return the list of engageable threats in this permutation and the total threat value of all engageable threats (WAT fitness).

The SOT value of an OC is simply the sum of fitness of all its non-empty WAT's. The fitness of an OC is then calculated by a weighted-sum of SOT and SOW. The fitness of all other members of the population is calculated in a similar way.

WASE-ASM

Just as in WASE-TKM above, determining the fitness of a chromosome of a population (OC) requires calculating the subset of threats with the highest objective function value (asset survived) that also satisfies all temporal and resource constraints. However, we cannot solve the problem independently at each weapon level as we did in WASE-TKM. Instead we need to calculate the fitness of each chromosome by the methods described below. The inventive algorithm can be run in several modes as described below.

Deterministic Mode:

Step 300. For each weapon system, consider all permutations (order) of threats assigned to it. For example, if a weapon had n threats assigned to it, we will have factorial (n) orders.

Step 302 For each permutation,
 a) Starting with the first threat and moving down the order, determine the earliest feasible time window in which a threat can be engaged (i.e., which satisfies temporal and resource constraints). If any threat cannot be engaged (no such time window exists), then this threat is deemed unengageable in this permutation.
 b) Return the list of engageable threats.

In one embodiment, this step is identical to the corresponding step described above for the WAS-TKM.

At this stage, we have a list of engageable threats for each permutation. It is possible that many of these lists are exactly the same or are subsets/supersets of other lists. A superset list is one that has all threats of a list (subset) in addition to at least one more threat. Note that it is also possible to have an empty list corresponding to a permutation if no threat can be engaged.

Step 304 (a) If two or more lists are the same, delete all but one of them.
 (b) If a list is a superset of one or more lists, delete all subset lists keeping only the superset list.
 The surviving lists are called "unique supersets" of these lists. We call this the Unique Superset List (USL) of this weapon system.

Step 306 Repeat steps S300, 302, and 304 for all weapon systems and now we have USLs for each weapon.

Step 308 Take all combinations of all USL and evaluate the objective function value (Note that a single combination gives us one instance of all engageable threats from all weapon systems). The objective function value in this case is the total surviving asset value.
 For example, if we had USLs of sizes 4, 6, 2, 10 (for 4 weapon system case), then the number of combinations is 4×6×2×10=480.

Step 310 Solution is the combination of highest value, which is the fitness of the chromosome.

Example:

Let us assume a scenario with 8 threats and 3 weapon systems, where each threat can be engaged by any of the weapon systems. Consider a GA population where threats 1-8 are assigned to weapon systems as 1, 2, 2, 3, 1, 3, 1, 3, respectively. Thus, the weapon assignment tables (WAT) are:

Weapon 1 is assigned threats 1 5,7
Weapon 2 is assigned threats 2,3
Weapon 3 is assigned threats 4,6,8

The feasible launch times and guidance duration times have not been specified for sake of keeping the example simple.

Step 1 Weapon 1 has !3=6 permutations: 157, 175, 517, 571, 715, 751

Step 2 Say due to temporal and resource constraints, the engageable threats for these permutations were computed to be: 17, 75, 5, 51, 75, 51

Step 3 Thus Weapon 1 has 3 USLs: 17, 75, 51

Step 4 Repeat steps 1-3 for all weapon systems. Say we ended up with following:
 Weapon 2 has 1 USL: 23
 Weapon 3 has 2 USLs: 68, 84

Step 5 Evaluate all combinations of USLs (number of combinations 3×1×2=6)
 172368, 172384, 752368, 752384, 512368, 512384
 These are the feasible solutions of engageable threats (satisfy all resource and temporal constraints). Calculate the objective function for each combination.

Step 6 Pick the combination with the highest objective function value. The threats in this combination are the ones that will be engaged.

Mixed Deterministic-Heuristic Mode (Fast):

Steps 1-4 are the same as in deterministic example above.

Step 5 Instead of evaluating all combinations (which could be a large number for big problems), use a fast heuristic method. Pick the N marginally best feasible USLs from each weapon system in terms of their expected surviving asset value (ESV) (note this calculation for each weapon system assumes all other threats for other weapon systems are unengaged, so no dependence across weapon systems).

Step 6 Evaluate (calculate the objective function value of) the resulting $N^M$ combinations (for M weapon systems). The choice of N should be based on the size of the problem (number of weapon systems and size of USLs).

Step 7 Solution is the combination of highest value (fitness of the GA chromosome)

Example:

Let us assume the same scenario as in the previous Example.

Steps 1-4 Same as Example above

From Steps 1-4, we had
 Weapon1 has 3 USLs: 17, 75, 51
 Weapon2 has 1 USLs: 23
 Weapon3 has 2 USLs: 68, 84

Step 5 Pick the "N" marginally best USL from each weapon system. If number of USLs is <N, all USL picked by default. Let N=2.
 Suppose the 2 "marginally" best USLs for weapon systems 1-3 are:
 Weapon1 has 3 USLs: 17, 51
 Weapon2 has 1 USL: 23
 Weapon3 has 2 USLs: 68, 84

Step 6 Number of combinations=2×1×2=4 and are: 172368, 172384, 512368, 512384

Step 7 Pick the combination with the highest objective function value. The threats in this combination are the ones that will be engaged.

Heuristic Mode (Fastest)

This mode should be used when the number of threats assigned to a weapon system is high. This mode has the highest computational speed, but may yield sub-optimal solutions.

For each weapon assignment table, do following steps:

Step 400 Select N random permutations (orders) of threats in the table (N is an integer number typically between 2-5).

Step 402 For each of these N permutations,
 a. Starting with the first threat and moving down the order, determine the earliest feasible time window in which a threat can be engaged (i.e., which satisfies temporal and resource constraints). If any threat cannot be engaged (no such time window exists), then this threat is deemed "unengageable" in this permutation.
 b. Return the list of engageable threats.
 c. Find the expected surviving assest value (ESV) for these engageable threats.

Step 404 Create a new permutation by pair-wise swapping of randomly selected threats of a randomly selected permutation (amongst the N permutations) and repeat step 2 for this permutation. Accept new permutation if it has higher (ESV) value than any of the M permutations computed in step 2, else accept this with a probability of acceptance (that is analogous to annealing temperature). If accepted, this new permutation will replace the permutation with the lowest (ESV) value, thus keeping the number of permutations same (N).

Step 406 For each value of temperature, repeat step 3 a fixed number of times and then lower acceptance probability according to a predetermined schedule.

Step 408 Stop the algorithm and go to step 5 if a permutation where all threats in the list are engageable is found or a maximum number of predetermined runs of step 4 have been exceeded. [Stop swapping pairs, or stop processing permutations?]

Step 410 Return the final N surviving permutations. These are the N "marginally best" feasible solutions from each weapon system.

Step 412 Perform steps 6-7 of the example above.

It is understood that the above is an exemplary embodiment of heuristic method in accordance with the present invention. Other embodiments will be readily apparent to one of ordinary skill in the art without departing from the present invention. For example, instead of using simulated annealing to determine the N marginally best USLs for each weapon system, other embodiments using a genetic algorithm or a particle swarm optimizer for can be used. The fitness of other members of the population can be calculated in a similar way.

In general, processing is terminated when a predetermined number of cycles have been completed or if the run time has exceeded a fixed time set by the battlespace commander or if the solution returned has the highest possible fitness value for the current battle-space.

Generating new populations can be performed using the conventional genetic algorithm operators, i.e., selection, crossover and mutation. Selection copies an individual from the old population to the new population depending on the fitness of the individual. Higher the fitness, the higher is the probability that the individual will survive in the new population. Crossover is a mating process where a new individual is created by mating two individuals from the old population. Mutation randomly alters the value of a gene in the individual. In this case, it amounts to randomly picking a new option for the threat represented by that gene position. The fitness of the new population is then evaluated and the process repeats until termination conditions are met.

In one embodiment, the output from WASE is the modified option table that shows the selected option (weapon system) for each threat by its phase field (scheduled or committed) and the corresponding optimized launch time.

Figure 5:
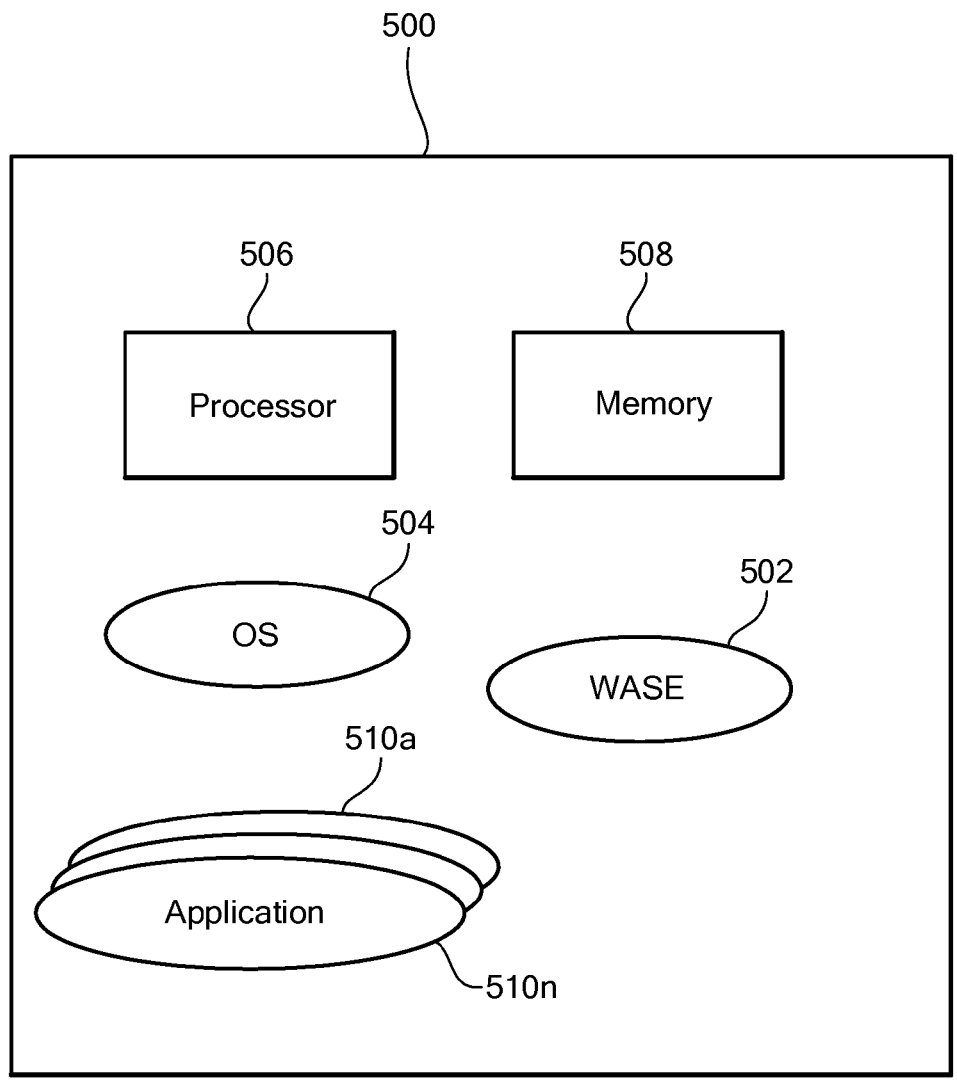
FIG. 5 is a block diagram of an exemplary system on which a weapon allocation and assignment engine can operate in accordance with exemplary embodiments.

It is understood that the WASE can operate in a variety of suitable processing environments. FIG. 5 shows an exemplary system 500 having a WASE 502 running under an operating system 504, such as Windows XP, 2000, Unix/Linux, etc. The system 500 includes a processor 506 and memory 508 to support the WASE 502 and other applications 510a-N running on the system.

While the invention is primarily shown and described in conjunction with weapon allocation and scheduling for military targets, it is understood that the invention is applicable to systems and techniques in general for which it is desirable to assign resources to tasks. Exemplary embodiments are directed to separate objective functions including threat killed maximization and asset survival maximization. However, other objective functions will be readily apparent to one of ordinary skill in the art without departing from the present invention. Further, alternative embodiments include more than two objective functions. In addition, while the use of genetic algorithms is shown and described, it is understood that other mechanisms can be used. In other embodiments, so-called pareto-optimal GAs can be used. Pareto-optimal GAs, for example, can solve for the disparate objective functions simultaneously.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A machine-implemented method comprising:
 automatically allocating and scheduling resources to tasks for optimizing engagement objectives using a computer by:
 modeling, using a processor, resources and temporal constraints of the resources such that the resources are allocated to tasks that the resources are able to perform, and
 representing, using a processor, an engagement schedule of a resource as an ordered list of tasks,
 wherein tasks in the engagement schedule are represented as an ordered list scheduled to occur as early as possible after the completion of the previous task, and any tasks that cannot be completed within their temporal constraints are deemed unperformable.

2. The method according to claim 1, wherein the modeling of engagement resources and temporal constraints occurs during the allocating to determine when to deploy the allocated resources.

3. The method according to claim 2, further including optimizing engagement times of the resources.

* * * * *

UNITED STATES PATENT AND TRADEMARK OFFICE
CERTIFICATE OF CORRECTION

| | | |
|---|---|---|
| PATENT NO. | : 7,757,595 B2 | Page 1 of 1 |
| APPLICATION NO. | : 11/279824 | |
| DATED | : July 20, 2010 | |
| INVENTOR(S) | : Khosla et al. | |

It is certified that error appears in the above-identified patent and that said Letters Patent is hereby corrected as shown below:

On the Title Page

Abstract line 4, delete "threat" and replace with --threats--.

Abstract line 7, delete "weapons" and replace with --weapon--.

Col. 3 line 10, delete "in primarily" and replace with --is primarily--.

Col. 8 line 6, delete "time" and replace with --times--.

Col. 8 line 45, delete "objective" and replace with --objectives--.

Col. 9 line 45, delete "status the" and replace with --status of the--.

Col. 10 line 40, delete "not" and replace with --no--.

Col. 13 line 65, delete "(JK)$^I$ The" and replace with --(JK)$^I$. The--.

Col. 15 line 2, delete "is number" and replace with --is the number--.

Col. 15 line 40, delete "technique" and replace with --techniques--.

Signed and Sealed this
Twenty-second Day of February, 2011

David J. Kappos
*Director of the United States Patent and Trademark Office*

UNITED STATES PATENT AND TRADEMARK OFFICE
CERTIFICATE OF CORRECTION

PATENT NO. : 7,757,595 B2
APPLICATION NO. : 11/279824
DATED : July 20, 2010
INVENTOR(S) : Khosla et al.

It is certified that error appears in the above-identified patent and that said Letters Patent is hereby corrected as shown below:

On the title page item [73]:

Assignee, delete "Raytheon Company, Waltham, MA (US)" and replace with --Thales Raytheon Systems Company, LLC, Fullerton, CA (US)--.

Signed and Sealed this
Twenty-first Day of February, 2012

David J. Kappos
*Director of the United States Patent and Trademark Office*